United States Patent
Moh et al.

(10) Patent No.: US 10,213,698 B2
(45) Date of Patent: Feb. 26, 2019

(54) DECISION MAKING SYSTEM FOR A USER TO MANAGE A SPORTS TEAM PLAYING A VIRTUAL GAME OVER A MEDIA FEED TO EVALUATE THEIR DECISION MAKING PERFORMANCE

(71) Applicant: Sports Maximization Inc., Brampton (CA)

(72) Inventors: Christopher Moh, New York, NY (US); Amarjot Thiara, Brampton (CA)

(73) Assignee: SPORTS MAXIMIZATION INC., Brampton, Ontario (CA)

(*) Notice: Subject to any disclaimer, the term of this patent is extended or adjusted under 35 U.S.C. 154(b) by 77 days.

(21) Appl. No.: 15/259,327

(22) Filed: Sep. 8, 2016

(65) Prior Publication Data
US 2017/0087472 A1 Mar. 30, 2017

Related U.S. Application Data

(60) Provisional application No. 62/234,753, filed on Sep. 30, 2015.

(51) Int. Cl.
*A63F 13/812* (2014.01)
*A63F 13/332* (2014.01)
(Continued)

(52) U.S. Cl.
CPC ............ *A63F 13/828* (2014.09); *A63F 13/25* (2014.09); *A63F 13/35* (2014.09); *A63F 2300/8011* (2013.01)

(58) Field of Classification Search
CPC ........ A63F 13/65; A63F 13/79; A63F 13/798; A63F 13/828; A63F 2011/0097; A63F 2300/558
See application file for complete search history.

(56) References Cited

U.S. PATENT DOCUMENTS

2002/0119823 A1* 8/2002 Beuscher ............... A63F 13/12
463/42
2007/0004516 A1* 1/2007 Jordan .................... A63F 13/12
463/42
(Continued)

*Primary Examiner* — Lawrence Galka

(57) ABSTRACT

Disclosed is a decision making system to assist users/coach in managing a sports team playing a virtual game/real game. The virtual game represents a real sports game received from a media feed. The decision making system includes a user database, a sports database, a decision model module, and a processing unit. The user database stores information about users. The sports database stores information related to each sport, including each game move for each sport, rules and regulations associated with each sport, and updated real-time statistics of each team and each player playing the sport. The decision model module coupled with the sports database, which determines possible game moves from the current on-field state of the real game, further the decision model module calculates a score based on the probability of winning the sports game after each possible game move using statistical information of teams and players, and rules and regulations. The processing unit coupled with the user database, the sports database, and the decision model module, which processes a data stream of the real sports game received from the media feed. The processing unit includes a game data module, a game move module and a score module to display the score associated with the user's selected game move in the game move module, wherein the score provides the user with feedback on their decision making ability to manage the virtual game concurrent to the real sports game.

13 Claims, 4 Drawing Sheets

(51) Int. Cl.
*A63F 13/828* (2014.01)
*A63F 13/25* (2014.01)
*A63F 13/35* (2014.01)

(56) References Cited

U.S. PATENT DOCUMENTS

| | | | | |
|---|---|---|---|---|
| 2008/0268929 | A1* | 10/2008 | Billmaier | G07F 17/32 463/4 |
| 2009/0176576 | A1* | 7/2009 | Billmaier | A63F 13/12 463/42 |
| 2013/0184039 | A1* | 7/2013 | Steir | A63F 13/12 463/1 |
| 2015/0174467 | A1* | 6/2015 | Colony | G06Q 50/34 273/317 |
| 2015/0350733 | A1* | 12/2015 | Persidis | H04N 21/4758 725/24 |
| 2016/0325186 | A1* | 11/2016 | Colony | G06Q 50/34 |
| 2017/0223415 | A1* | 8/2017 | Jeon | H04N 21/4667 |

* cited by examiner

DECISION MAKING SYSTEM FOR A USER TO MANAGE A SPORTS TEAM PLAYING A VIRTUAL GAME OVER A MEDIA FEED TO EVALUATE THEIR DECISION MAKING PERFORMANCE

CROSS REFERENCE TO RELATED APPLICATION

The present application claim priority from the U.S. provisional patent application No. 62/234,753 dated Sep. 30, 2015. The specification of the provisional patent application is incorporated herein by this reference as though set forth in full.

BACKGROUND OF THE INVENTION

1. Field of the Invention

The present invention relates generally to use of computer-based systems to engage viewers of an event, and more particularly relates to a decision making system for a user to manage a sports team playing a virtual game over a media feed to evaluate their decision making performance.

2. Description of Related Art

Almost a decade ago, the only way to connect with an ongoing live event was either by watching it on TV or by attending the event in person. With the increasing use of internet-based interconnected computing devices, which may include, but are not limited to, laptops, phones, tablets, desktop computers and smart TVs, more and more people are engaging with a live event by constantly checking on updates through various online social networks (Facebook, Twitter, Instagram, etc.) or by watching it "on the go" through webcasts or podcasts.

In the specific case of a sporting event, people also like to check on latest scores and various updates, such as decisions made by coaches, managers, captains or any other on-field decision-maker in a specific gameplay scenario. Those watching these events on a TV or in person also like to check internet-based media to access past or present statistics related to the sporting event, analysis by experts, and similar information which have traditionally not been available to them.

During the game play, the viewers may or may not concur with the decisions made by the on-field decision-maker, such as a coach, a manager or a captain of a team, and may have their own opinion on the best course of action which should have been taken, based on their own experiences and observations. However, they do not have a way to validate in real-time or near real-time whether their choice of decision and corresponding actions would be more likely to have resulted in a better outcome for a scenario in a live game.

At present, there are several computer games which simulate real life sports events. These games allow a user to interact with the simulated game environment based on a pre-defined set of parameters. However, there is no way for the user to test his or her hypothesis about a decision in a live gameplay scenario, as these simulated game environments lack a sense of reality due to pre-defined parameters and not being 'live' enough (i.e. close enough to the actual live event to be able to fully appreciate the impact that a decision or action might have had).

Additionally, these simulated game environments lack the ability to help the user ascertain whether his or her choice would have been as effective as or better than the one made by the on-field decision-maker, such as a coach, a manager or a captain of a team, during the live event in real-time or near real-time.

Therefore, there is a need for a decision making system that enables a user to manage a sports team by playing a virtual game, and evaluate his or her decision making performance, wherein the virtual game represents a real sports game received from a media feed.

SUMMARY OF THE INVENTION

The present invention facilitates a decision making system for a user to manage a sports team by playing a virtual game, wherein the virtual game represents a real sports game received from a media feed, and evaluate their decision making performance.

An object of the present invention is to provide the decision making system with a user database for storing information about users, a sports database for storing information related to each sport, a decision model module coupled with the sports database, and a processing unit coupled to the user database, the sports database and the decision model module.

The sports database further includes information on each game move for each sport, rules and regulations associated with each sport, and updated real-time statistics of each team and each player playing the sport. Hereinafter the legal game move is described and explained as game move. The decision model module determines possible game moves from the current on-field state of the real game.

Further, the decision model module calculates a score for each possible game move based on the probability of winning the sports game after implementing the game move using statistical information of teams and players together with rules and regulations. The processing unit processes a data stream of the real sports game received from the media feed. The processing unit includes a game data module, a game move module and a score module.

The game data module displays the current state of the virtual game extracted from the real sports game received from the media feed. The game move module displays at least two game moves allowing the user to select at least one of the game moves to manage the sports team at the current state of the virtual game.

The score module displays the score associated with the user's selected game move in the game move module, wherein the score provides the user with feedback on their decision making ability to manage the virtual game concurrent to the real sports game. The score lets the user know how their selected game move affects their chances of winning the real sports game.

Another object of the present invention is to provide the processing unit with a rank module to display the rank of the user among all users playing the virtual game. Further, the rank is determined by ranking users scores, wherein the score of the user is calculated by the decision model module from the user's choice.

Another object of the present invention is to provide the processing unit with an average module to calculate the average score of the user from all the game moves selected by the user to manage the virtual game up to its current state. Another object of the present invention is to provide the processing unit with a challenge module to allow each user to challenge at least one of the other registered users. Another object of the present invention is to provide the processing unit with an energy module to display the remaining energy of the user to play the virtual game.

Another object of the present invention is to provide a decision making system for aiding a coach to manage a sports team playing a real sports game. The system receives game data associated with the real sports game from a media feed. The system further communicates with the coach via a communication device. The system includes a sports database, a decision model module, and a processing unit coupled to the sports database and the decision model module.

The processing unit includes a game data module to display the current state of the virtual game and a game move module to display the best possible game moves on the communication device, wherein the best possible game moves manages the sports team at the current on-field situation of the real sports game are evaluated by the decision making model based on calculated scores of game moves.

Another object of the present invention is to provide an equity module coupled with the decision model module to display the equity of each game move in the current on-field situation of the real sports game. Another object of the present invention is to provide a magnitude module to calculate the magnitude of the current play based on the difference in equities between the coach's possible game moves to manage the real sports game in the current on-field situation of the real sports game.

Another object of the present invention is to provide an alert module to display an alert message on the communication device indicating the urgency of selecting the best ranked game move in the current on-field situation of the real sports game, wherein the urgency is greater when the magnitude of the current play is greater.

Further features and advantages of the present invention, as well as the structure and operation of various embodiments of the present invention, are described in detail below with reference to the accompanying drawings.

DETAILED DESCRIPTION OF DRAWINGS

Figure 1:
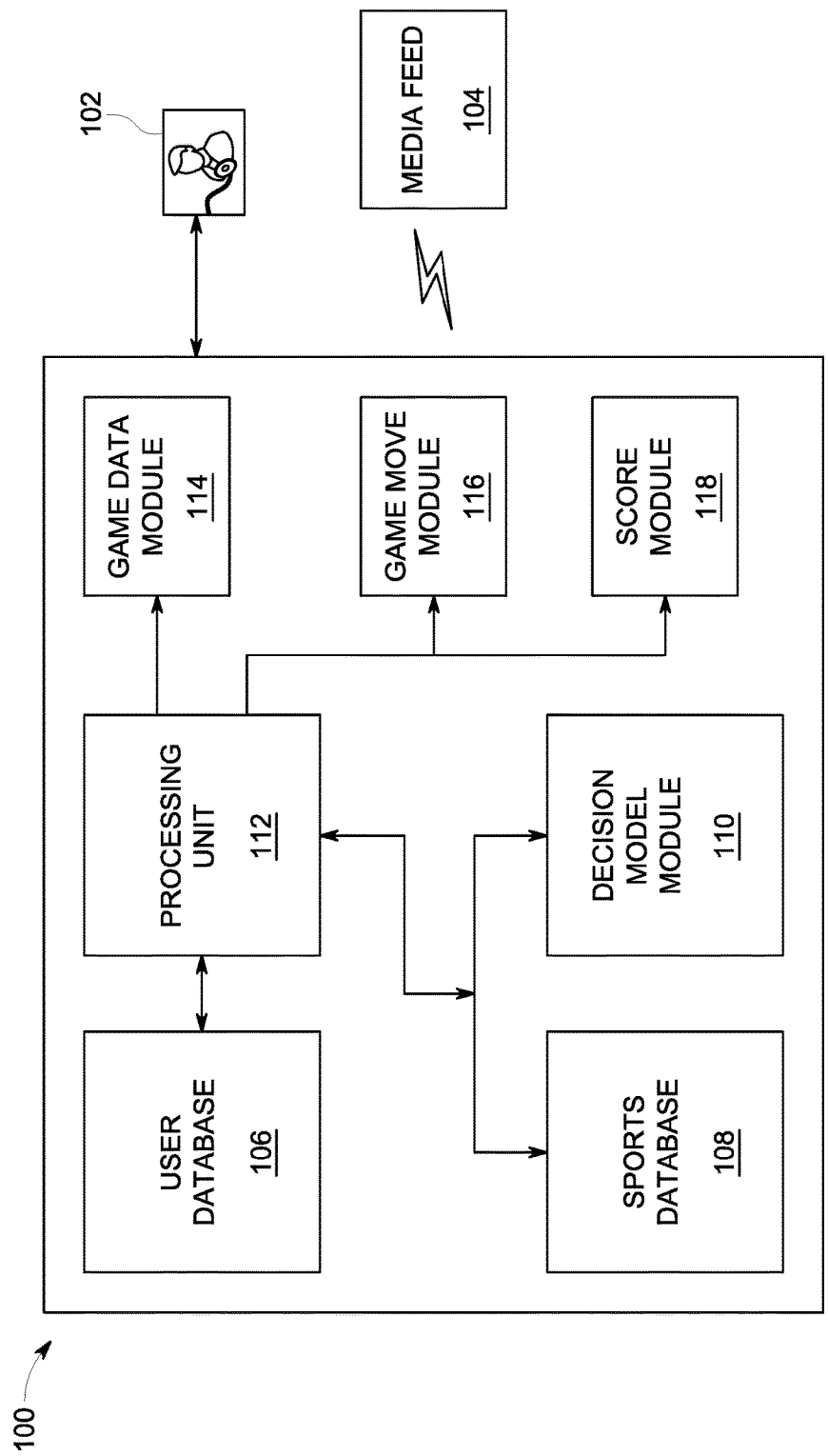
FIG. 1 illustrates a block diagram of a decision making system for a user to manage a sports team playing a virtual game, and evaluate their performance.

While this technology is illustrated and described in a preferred embodiment, a decision making system for interacting with an object and one or more peripheral units may be produced in many different configurations, forms, and with various materials. This is depicted in the drawings and will be described in detail, as a preferred embodiment of the invention, with the understanding that the present disclosure is to be considered as an exemplification of the principles of the invention and the associated functional specifications for its construction. It is not intended to limit the invention to the embodiment illustrated. Those skilled in the art will envision many other possible variations within the scope of the technology described herein.

FIG. 1 illustrates a block diagram of a decision making system 100 for a user 102 to manage a sports team playing a virtual game. The virtual game represents a real sports game received from a media feed 104. The decision making system 100 includes a user database 106 for storing information about users, a sports database 108, a decision model module 110 coupled with the sports database 108, and a processing unit 112 coupled to the user database 106, the sports database 108 and the decision model module 110.

The user database 106 stores various user information including but not limited to name, email ID, phone number, social media login, password, favorite team, favorite sport, birthday etc. The sports database 108 stores information related to each sport, each game move for each sport, rules and regulations associated with each sport, and updated real-time statistics of each team and each player playing the sport.

Examples of sports include but are not limited to Football, Tennis, Baseball, etc. Examples of game moves for football include but are not limited to Hail Mary Pass, Pass, Run, Timeout, Field Goal, etc. The game moves are shown and explained in detail in conjunction with FIG. 2 of the present invention.

Examples of rules and regulations associated with each sport includes but are not limited to, score calculation, possession rules, fouls, duration of game, etc. The sports database 108 further receives data in near real-time about each team and each player playing the sport.

The decision model module 110 determines possible game moves from the current on-field state of the real game. Further, the decision model module calculates a score based on the probability of winning the sports game after each possible game move using statistical information of teams and players, as well as rules and regulations.

The processing unit 112 processes a data stream of the real sports game received from the media feed 104. The processing unit 112 processes data stream of the real sports game received from the media feed 104. The processing unit 112 includes a game data module 114, a game move module 116 and a score module 118.

The game data module 114 displays the current state of the virtual game extracted from the real sports game received from the media feed. The game data module 114 is explained in detail in conjunction with FIG. 2 of the present invention. The game move module 116 displays at least two game moves allowing the user to select at least one of the game moves to manage the sports team in the current state of the virtual game. The game move module 116 is explained in detail in conjunction with FIG. 2 of the present invention.

The score module 118 displays the score associated with the user's selected game move in the game move module 116. The score provides the user with feedback on their decision making ability to manage the virtual game concurrent to the real sports game. The score module 118 is explained in detail in conjunction with FIG. 2 of the present invention.

Figure 2:
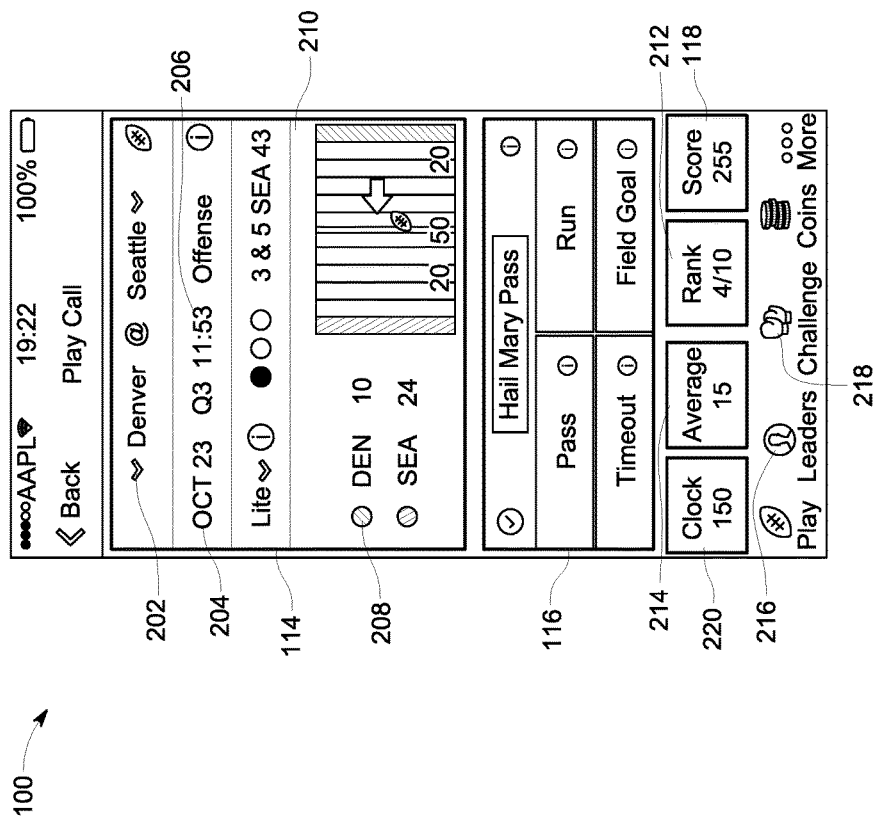
FIG. 2 is a screenshot showing a decision making system in accordance with a preferred embodiment of the present invention.

FIG. 2 is a screenshot showing of a decision making system 100 in accordance with a preferred embodiment of the present invention. With reference to FIG. 1 of the present invention, the game data module 114 displays the current state of the virtual game extracted from the real sports game received from the media feed.

In a preferred embodiment of the present invention, the game data module 114 displays the name of two sports teams playing the real sports game. For exemplary purposes, as shown in FIG. 2, the two sports teams, Denver and Seattle are playing football as shown in 202. Further, the game data module 114 discloses the date 204 of the match which in the example is October 23.

Furthermore, the game data module 114 displays the current on field situation 206 of the real game. In an exemplary embodiment, the current on-field situation 206 is Quarter 3 (Q3) with remaining time 11:53. Further, the game data module 114 shows the current score 208. In an exemplary embodiment, the current score 208 shown is Denver 10 Seattle 24.

Furthermore, the game data module 114 displays a screen 210 to display the current on-field situation of the game received through the media feed. In an exemplary embodiment, the screen 210 displays the position of the ball at Seattle's 43 yard line.

It would be apparent to those skilled in the art that various data may be envisioned through the game data module 114 without deviating from the scope of the present invention. In a preferred embodiment of the present invention, the game data module 114 displays data from a game of football; however, it would be readily apparent to those skilled in the art that various games may be envisioned without deviating from the scope of the present invention.

The game move module 116 displays at least two game moves for the user to select in order to manage the sports team at the current state of the virtual game. In an exemplary embodiment, the game move module 116 displays game moves in football such as Hail Mary Pass, Pass, Run, Timeout and Field Goal. The game moves are determined by the decision model module from the current on-field state of the real game and other statistical information.

The user selects one of the game moves displayed in the game move module 116 to manage the sports team at the current state of the virtual game. In an exemplary embodiment as shown in FIG. 2, the user selects the game move as Hail Mary.

The score module 118 displays the score associated with the user's selected game move in the game move module 116. The score module 118 allows the user to evaluate their performance in managing the virtual game concurrent to the real sports game. In an exemplary embodiment, the score module 118 displays the score for the selected game move Hail Mary, and herein for exemplary purposes the score 255 is shown as an accumulated score.

The score associated with each game move is calculated by the decision model module. Thus, upon the selection of the game move by the user, the score is displayed in the score module 118 based on the assessment made by the decision model module.

In another preferred embodiment of the present invention, the processing system further includes a rank module 212 to display the rank of the user among all users playing the virtual game. The rank is determined by ranking users' scores, wherein the scores are calculated by the decision model module from users' choices. In an exemplary embodiment as shown in FIG. 2, the rank of the user is 4/10.

In another preferred embodiment of the present invention, the processing system further includes an average module 214 to calculate the average score of the user from all the game moves selected by the user to manage the virtual game up to its current state. In an exemplary embodiment as shown in FIG. 2, the average score of the user is 15. In another preferred embodiment of the present invention, the processing system further includes an energy module 220 to display the remaining energy of the user to play the virtual game.

In another preferred embodiment of the present invention, the processing system further includes a leader module 216 to display the list of leaders from all users based on scores calculated through the score module 118. Further, in another preferred embodiment, the processing system further includes a challenge module 218 to allow a user to challenge at least one of the other registered users.

Figure 3:
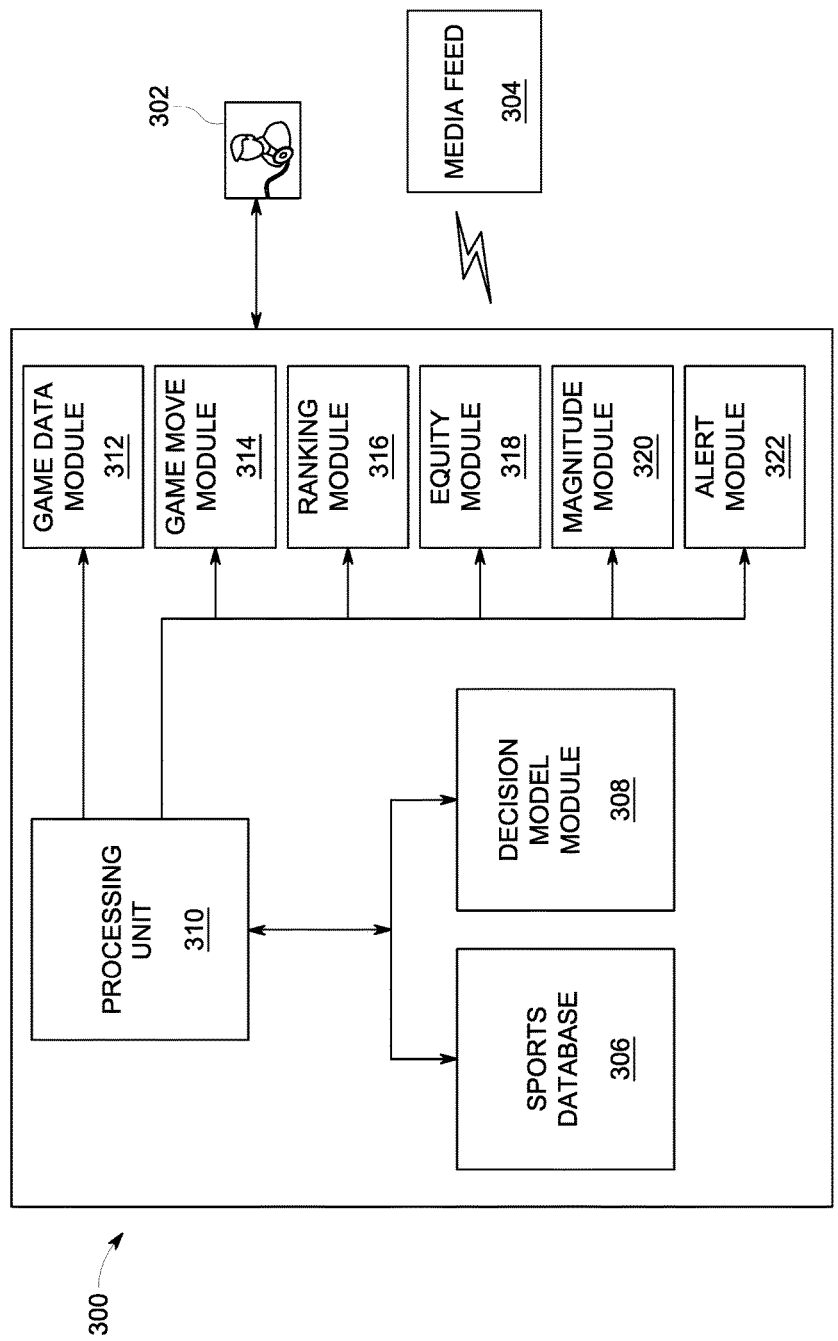
FIG. 3 illustrates a block diagram of a decision making system for aiding a coach to manage a sports team playing a real sports game in accordance with another preferred embodiment of the present invention.

FIG. 3 illustrates a block diagram of a decision making system 300 for aiding a coach 302 to manage a sports team playing a real sports game, in accordance with another preferred embodiment of the present invention. The decision making system 300 receives game data associated with the real sports game from a media feed 304. The decision making system 300 communicates with the coach 302 via a communication device.

The decision making system 300 includes a sports database 306, a decision model module 308, and a processing unit 310 coupled with the sports database 306 and the decision model module 308. The processing unit 310 processes a data stream of the real sports game from the media feed.

The sports database 306 stores various information that is related to each sport, including each game move for each sport, rules and regulations associated with each sport, and updated real-time statistics of each team and each player playing the sport. Further, the processing unit 310 includes a game data module 312 and a game move module 314.

The game data module 312 displays the current state of the virtual game extracted from the real sports game received from the media feed. The game move module 314 displays the best possible one or more game moves on the communication device. The best possible game moves manages the sports team at the current on-field situation of the real sports game are evaluated by the decision making model based on calculated scores of game moves.

In another preferred embodiment of the present invention, the processing unit 310 further includes a ranking module 316 coupled with the decision model module 308 for ranking the game moves, and an equity module 318 to display the equity of each game move. The ranking module 316 and the equity module 318 are explained in detail in conjunction with FIG. 4 of the present invention.

In another preferred embodiment of the present invention, the processing unit 310 further includes a magnitude module 320 to calculate the magnitude of the current play based upon differences in equities between the coach's possible game moves to manage the real sports game. The magnitude module is explained in detail in conjunction with FIG. 4 of the present invention.

In another preferred embodiment of the present invention, the processing unit 310 further includes an alert module 322 to display an alert on a communication device. The alert message indicates the urgency of acting upon the decision by the coach to select the provided game move, where the urgency is high for high magnitude plays. The alert module 322 is explained in detail in conjunction with FIG. 4 of the present invention.

Figure 4:
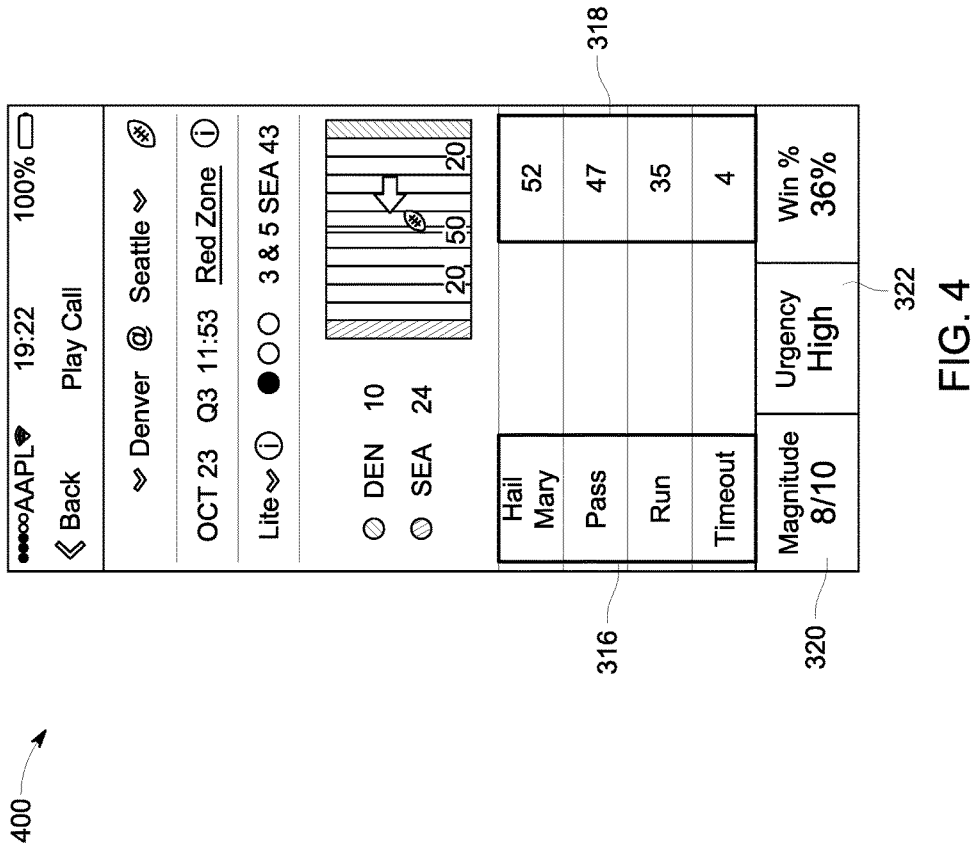
FIG. 4 illustrates a screenshot showing the decision making system in accordance with another preferred embodiment of the present invention.

FIG. 4 illustrates a screenshot showing of the decision making system 300 in accordance with another preferred embodiment of the present invention. With reference to FIG. 3, the ranking module 316 lists the game moves in order of rank. For exemplary purposes and as shown in FIG. 4, the best game move is HAILMARY for the current on-field situation and the least ranked game move is TIMEOUT.

Further with reference to FIG. 3, the equity module 318 displays the equity for each game move. In an exemplary embodiment, and as shown in FIG. 4, the equity for the game move HAIL MARY is 52, PASS is 47 and RUN is 35. Further, the magnitude module 320 displays magnitude of the play. In an exemplary embodiment, the magnitude is shown as 8/10.

The alert module 322 alerts the coach about the urgency to make the decision in selecting the best ranked game move in the current on-field situation of the real sports game. In the example in FIG. 4, the urgency is HIGH, i.e. the coach should immediately act on the top-ranked game move in the ranking module 316.

The present invention offers various advantages such as providing users a gaming platform to evaluate their decision making performance. Further, the present invention offers users to get involved in the on field sport game and thus making more interactive the game watching process. Further, the present invention provides a virtual social game that allows user to compete with their friends as they watch the real sports game. Further, the present invention allows coach to make more insightful decisions in the game using real time data, statistics, game rules and regulations.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A decision making system for a user to manage a sports team playing a virtual game, wherein the virtual game represents a real sports game received from a media feed, the decision making system comprising:
  a user database for storing information about users;
  a sports database for storing information related to each sport, including each game move for each sport, rules and regulations associated with each sport, and updated real-time statistics of each team and each player playing the sport;
  a decision model module coupled with the sports database, which determines possible game moves from the current on-field state of the real game, further the decision model module calculates a score based on the probability of winning the sports game after each possible game move using statistical information of teams and players, and rules and regulations; and
  a processing unit coupled with the user database, the sports database, and the decision model module, wherein the processing unit automatically processes a data stream of the real sports game received from the media feed to automatically extract and automatically display both the game moves and the current on-field situation of the real sports game, said processing unit comprising:
    a game data module to display the current state of the virtual game automatically extracted from the real sports game received from the media feed, wherein the current state indicates the current on-field situation of the real sports game;
    a game move module to display at least two game moves allowing the user to select at least one of the game moves to manage the sports team in the current state of the virtual game, wherein the game moves are extracted from the decision model module on processing of the media feed by the processing unit;
    a score module to display the score associated with the user's selected game move in the game move module, wherein the score provides the user with feedback on their decision making ability to manage the virtual game concurrent to the real sports game, wherein the score is based on the probability of winning the sports game after each possible game move.

2. The decision making system according to claim 1 wherein the processing unit further comprising a rank module to display the rank of the user among all users playing the virtual game, wherein the rank is determined by ranking users scores, wherein the score of the user is calculated by the decision model module from the user's choice.

3. The decision making system according to claim 1 wherein the processing unit further comprising an average module to calculate the average score of the user from all the game moves selected by the user to manage the virtual game up to its current state.

4. The decision making system according to claim 1 wherein the processing unit further comprising a leader module to display the list of leaders of all the users on the basis of scores calculated through the score module in playing the virtual game.

5. The decision making system according to claim 1 wherein the processing unit further comprising a challenge module to allow each user to challenge at least one of the other registered users.

6. The decision making system according to claim 1 wherein the processing unit further comprising an energy module to display the remaining energy of the user to play the virtual game.

7. The decision making system according to claim 1 wherein the game data module displays the name of two sports teams playing the real sports game.

8. The decision making system according to claim 1 wherein the game data module displays a playing date of the real sports game relayed from the media feed.

9. The decision making system according to claim 1 wherein the game data module displays the current score of each team playing the real sports game.

10. The decision making system according to claim 1 wherein the game data module displays the current on-field situation of the game received through the media feed.

11. The decision making system according to claim 1 wherein the sport event is at least one of: Football; Baseball; Tennis.

12. The decision making system according to claim 11 wherein the screen displays yards, number of downs remaining, and time remaining in American Football.

13. The decision making system according to claim 11 wherein the screen displays players on base, the number of outs remaining, and the inning number in Baseball.

* * * * *